United States Patent Office 3,577,383
Patented May 4, 1971

3,577,383
DIBUTYL THIO UREA AS A UV ABSORBER FOR POLYURETHANES
Grant O. Sedgwick, Minneapolis, Minn., assignor to Ashland Oil, Inc., Ashland, Ky.
No Drawing. Filed Nov. 1, 1966, Ser. No. 591,129
Int. Cl. C08g 51/60
U.S. Cl. 260—45.9
5 Claims

ABSTRACT OF THE DISCLOSURE

Aromatic diisocyanate derived polyurethanes which inherently exhibit a pronounced tendency toward discoloration upon exposure to UV light are stabilized against such deleterious effect by the presence therein of a small amount of a dialkyl substituted thio urea.

---

This invention concerns the use of dibutyl thio urea as a UV absorber in polyurethanes.

Polyurethanes form a well-known class of synthetic condensation products. Polyurethanes are prepared by reacting polyfunctional alcohols (e.g. ethylene, glycol pentaerythritol or hydroxyl containing polyesters) with polyisocyanates (e.g. toluene diisocyanate). The preparation and characterization of polyurethanes are well known and, as such, form no part of the present invention.

Cured polyurethanes (e.g. coatings, foams, etc.) made from aromatic polyisocyanates (especially toluene-2,4-diisocyanate) have an inherit tendency to become yellow when exposed to sunlight. This is an art recognized problem. Consequently, it is common to use various ultra-violet light (UV) absorbers in admixture with polyurethanes to reduce the degree of yellowing which is encountered. However, the degree of yellowing which is encountered, even when using conventional UV absorbers, is much greater than desired. For example, solvent solutions of polyurethane pre-polymers prepared from polyhydric alcohols and aromatic diisocyanates (e.g. TDI), using excess diisocyanate, are commonly used as vehicles in varnishes. Such polyurethane pre-polymers cure in the presence of moisture (e.g. moisture in humid air) and form hard, durable, abrasion-resistant films useful as finishes on hardwood floors, furniture and the like. One of the major disadvantages of such moisture-curing polyurethane varnishes is the tendency of cured films obtained therefrom to yellow with age.

I have now discovered that it is possible to substantially reduce the amount of yellowing obtained with polyurethanes made from aromatic polyisocyanates by admixing UV absorbing amounts of alkyl substituted thio ureas (e.g. dibutyl thio urea) with the polyurethanes prior to curing. The use of 1,3-dibutyl thio urea is especially advantageous in moisture-curing polyurethane varnishes which have been made with toluene-2,4-diisocyanate (TDI).

The amount of dibutyl thio urea used will be a UV absorbing amount of up to 10% based upon the weight of the polyurethane of polyurethane-forming ingredients (i.e. neglecting any consideration of solvents, catalysts, etc.). In moisture cured polyurethane systems (e.g. urethane varnishes), the amount of water used in obtaining the final cure can be neglected in determining the amount of dibutyl thio urea to use. Ordinarily, the amount of dibutyl thio urea present will be from 1 to 5% by weight, on the same basis. An especially preferred amount is approximately 2.5% by weight, on the same basis.

It is convenient to add dibutyl thio urea to solvent solutions (e.g. xylene solutions) of polyurethane pre-polymers at elevated temperatures. Temperatures between 55° C. and 77° C. are especially well suited for this mixing. However, higher and lower temperatures can be used. Because elevated temperatures facilitate the admixing of dibutyl thio urea with solutions of polyurethane pre-polymers, it is convenient to add dibutyl thio urea immediately after the polyurethane pre-polymer has been prepared (i.e. prepared from polyols and polyisocyanates) and while the polyurethane pre-polymer is being cooled for storage or packaging.

The present invention is further illustrated by the following example. Unless otherwise indicated, all parts and percentages are by weight. In this example, three mil wet films of a white polyvinyl acetate paint were cast on several sheets of paper and allowed to dry. Then, six mil wet films of the various polyurethane varnishes were applied over separate sheets of the white coated paper. The wet films of polyurethane varnish were then allowed to moisture cure to a tack-free state in a controlled humidity atmosphere (i.e. 77° F. and 50% relative humidity). After the curing step, the paper panels were placed in a Weatherometer and exposed to ultra-violet light for sixteen hours. To have a basis for comparing the degree of discoloration caused by this exposure to UV light, Rd values (a measure of the light reflected by the films) were determined using a Gardner color difference meter. A perfectly diffusing white film would have an Rd value of 100. The more discoloration that occurs, the lower the Rd value will become. Corroborative tests were also run using natural sunlight as the source of UV light.

EXAMPLE 1

In this example, a commercially available moisture curing polyurethane solution was used. This varnish (Arothane 170, a product of Archer Daniels Midland Co.) is a xylene solution of a polyurethane pre-polymer (42% non-volatile). The pre-polymer is prepared by conventional techniques using a mixture of polyols and toluene diisocyanate (TDI). The varnish contains a small amount of tri-ethylene diamine to assist the moisture curing reaction. This solution was heated to 60°–77° C. and 2.5% by weight of 1,3-dibutyl thio urea (based on the weight of the polyurethane pre-polymer) was added to the solution with agitation. After the dibutyl thio urea had completely dissolved, the polyurethane pre-polymer solution was cooled.

Next, films of this polyurethane solution were cast on white paper, cured, and exposed to UV light in the manner previously indicated. When tested for discoloration, the film containing dibutyl thio urea has an Rd value of 74 as compared to an Rd value of 64 for films prepared from the same commercially available polyurethane solution, but which did not contain any dibutyl thio urea.

EXAMPLE 2

The procedure of Example 1 was repeated using 5% of 1,3-dibutyl thio urea, based on the weight of the polyurethane solution. The resulting Rd value was 76 as compared to 64 for films prepared from the same polyurethane solution, but which did not contain any dibutyl thio urea.

What is claimed is:
1. A composition comprising a polyurethane, prepared from a polyol and a toluene diisocyanate, having incorporated therein, to inhibit discoloration of said polyurethane when exposed to ultra violet light, a stabilizing amount of 1,3-dibutyl thiourea.
2. A resinous surface coating composition capable of being cured to an insoluble, infusible film exhibiting improved UV light resistance toward discoloration comprising a polyol-aromatic diisocyanate pre-polymer having dissolved therein from about 1–10% of 1,3-dibutyl thio urea.
3. A composition in accordance with claim 2 wherein said aromatic diisocyanate is toluene-2,4-diisocyanate and wherein the amount of said thio urea is from about 1–5%.
4. The insoluble, infusible cured composition of claim 2.
5. The insoluble, infusible cured composition of claim 3.

References Cited

UNITED STATES PATENTS

| | | | |
|---|---|---|---|
| 2,583,370 | 1/1952 | Goppel et al. | 260—45.9 |
| 3,124,543 | 3/1964 | Fowler et al. | 260—45.9 |

FOREIGN PATENTS

| | | | |
|---|---|---|---|
| 873,697 | 7/1961 | Great Britain | 260—40.9 |
| 876,710 | 9/1961 | Great Britain | 260—40.9 |

HOSEA E. TAYLOR, Primary Examiner

U.S. Cl. X.R.

1—77.5; 117—155; 260—75